(12) United States Patent
Ziemer et al.

(10) Patent No.: US 8,721,483 B2
(45) Date of Patent: May 13, 2014

(54) ARRANGEMENT COMPRISING AT LEAST ONE DOG CLUTCH

(75) Inventors: Peter Ziemer, Tettnang (DE); Peter Tiesler, Meckenbeuren (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 296 days.

(21) Appl. No.: 13/375,798

(22) PCT Filed: May 19, 2010

(86) PCT No.: PCT/EP2010/056908
§ 371 (c)(1),
(2), (4) Date: Dec. 2, 2011

(87) PCT Pub. No.: WO2010/139558
PCT Pub. Date: Dec. 9, 2010

(65) Prior Publication Data
US 2012/0083374 A1 Apr. 5, 2012

(30) Foreign Application Priority Data
Jun. 4, 2009 (DE) .......................... 10 2009 026 710

(51) Int. Cl.
*F16H 3/44* (2006.01)

(52) U.S. Cl.
USPC ........... 475/138; 475/303; 475/311; 475/900; 192/221

(58) Field of Classification Search
USPC ............... 475/138, 303, 311, 900; 192/85.18, 192/221, 69.91; 188/31
See application file for complete search history.

(56) References Cited

U.S. PATENT DOCUMENTS

| | | | | |
|---|---|---|---|---|
| 2,603,327 A | * | 7/1952 | King | 192/85.56 |
| 2,695,533 A | * | 11/1954 | Pollard | 475/45 |
| 2,936,864 A | * | 5/1960 | Schjolin et al. | 477/59 |
| 3,444,972 A | | 5/1969 | Carstensen et al. | |
| 3,500,970 A | * | 3/1970 | Schilling | 188/170 |
| 4,359,145 A | | 11/1982 | Huff | |
| 4,611,506 A | * | 9/1986 | Groothius | 475/138 |
| 5,019,022 A | | 5/1991 | Uhlig et al. | |
| 5,366,053 A | * | 11/1994 | Yant | 192/219.2 |
| 5,667,330 A | | 9/1997 | Henkel et al. | |
| 5,679,096 A | | 10/1997 | Stine et al. | |
| 5,695,030 A | * | 12/1997 | Medcalf, Jr. | 192/220.2 |
| 5,890,988 A | * | 4/1999 | Kasuya et al. | 475/282 |
| 6,010,018 A | * | 1/2000 | Pech | 212/292 |
| 6,079,539 A | | 6/2000 | Fetcho et al. | |
| 6,131,686 A | | 10/2000 | Scotti et al. | |
| 6,186,262 B1 | * | 2/2001 | Mann et al. | 180/308 |
| 7,198,143 B2 | | 4/2007 | Legner | |
| 7,278,942 B2 | | 10/2007 | Klemen et al. | |

(Continued)

FOREIGN PATENT DOCUMENTS

| | | |
|---|---|---|
| CH | 304 821 | 1/1955 |
| DE | 634 500 | 12/1934 |

(Continued)

*Primary Examiner* — Sherry Estremsky
(74) *Attorney, Agent, or Firm* — Davis & Bujold, PLLC; Michael J. Bujold

(57) ABSTRACT

An arrangement which comprises at least one claw clutch that can be connected to at least one component of a transmission, such that the claw clutch is arranged substantially within a bearing support (1) of the transmission.

15 Claims, 4 Drawing Sheets

(56) References Cited

U.S. PATENT DOCUMENTS

| | | |
|---|---|---|
| 7,331,894 B2 * | 2/2008 | Sowul et al. .................. 475/138 |
| 7,357,235 B2 | 4/2008 | Schmidt et al. |
| 7,419,041 B2 | 9/2008 | Diemer et al. |
| 7,789,792 B2 | 9/2010 | Kamm et al. |
| 2005/0178638 A1 * | 8/2005 | Kramer et al. ............. 192/219.4 |
| 2006/0025278 A1 * | 2/2006 | Antonov et al. .............. 475/318 |
| 2006/0040782 A1 | 2/2006 | Diemer et al. |
| 2009/0163314 A1 | 6/2009 | Bock et al. |
| 2009/0301248 A1 | 12/2009 | Mohr et al. |
| 2010/0043586 A1 | 2/2010 | Mohr et al. |

FOREIGN PATENT DOCUMENTS

| | | |
|---|---|---|
| DE | 866 290 | 7/1949 |
| DE | 1 550 769 | 7/1969 |
| DE | 2 316 560 | 10/1973 |
| DE | 2 246 123 | 3/1974 |
| DE | 39 28 133 A1 | 3/1990 |
| DE | 38 36 956 A1 | 5/1990 |
| DE | 199 01 414 A1 | 7/2000 |
| DE | 697 07 954 T2 | 6/2002 |
| DE | 102 29 515 A1 | 1/2004 |
| DE | 103 05 434 A1 | 7/2004 |
| DE | 103 34 450 A1 | 2/2005 |
| DE | 10 2005 035 156 A1 | 3/2006 |
| DE | 10 2005 037 402 A1 | 3/2006 |
| DE | 10 2005 038 925 A1 | 3/2006 |
| DE | 10 2005 002 337 A1 | 8/2006 |
| DE | 10 2006 022 176 A1 | 11/2007 |
| DE | 10 2006 049 274 A1 | 4/2008 |
| DE | 10 2006 049 281 A1 | 4/2008 |
| DE | 10 2008 010 064 A1 | 8/2009 |
| GB | 1 367 433 | 9/1974 |
| GB | 2 368 102 A | 4/2002 |
| WO | 2005/008096 A1 | 1/2005 |

* cited by examiner

ARRANGEMENT COMPRISING AT LEAST ONE DOG CLUTCH

This application is a National Stage completion of PCT/EP2010/056908 filed May 19, 2010, which claims priority from German patent application serial no. 10 2009 026 710.7 filed Jun. 4, 2009.

FIELD OF THE INVENTION

The present invention concerns an arrangement comprising at least one dog clutch.

BACKGROUND OF THE INVENTION

From automotive technology, arrangements are known, which comprise at least one dog clutch as a shifting element for connecting a shaft of a transmission to a component. For example, in the document GB 2 368 102 A an automatic transmission with a device for decoupling the transmission from a drive-train of a vehicle is described. The device is in the form of a dog clutch which is actuated hydraulically by means of an actuating piston arranged inside a shaft. The actuating piston is acted upon by pressure on one side, to move it against the force of a restoring spring. To actuate the shifting claw a shifting finger coupled to the actuating piston is used, which projects through an aperture of the shaft.

Furthermore, another arrangement with a dog clutch as a shifting element is known from the document U.S. Pat. No. 5,667,330 A. In this known arrangement the dog clutch is used to connect a power take-off shaft to a transmission output shaft of a tractor. For this, an actuating piston inside the output shaft is acted upon hydraulically on one side in opposition to the force of a restoring spring, and the shifting claw is actuated by a bolt which extends through an opening in the output shaft from the actuating piston to the shifting claw. Thus, in the known arrangement the dog clutch is actuated from inside the shaft.

Finally, the document U.S. Pat. No. 6,079,539 A discloses an axle decoupling device with which, by means of a clutch sleeve, a first part of a drive input shaft can be coupled to a second part of the drive input shaft or decoupled therefrom. The clutch sleeve is mounted in a rotationally fixed manner on one of the two drive input shaft parts and, for the coupling or decoupling, can be displaced axially by a shifting fork. This type of arrangement takes up not inconsiderable structural space.

DE 102005035156A1 describes an interlocking shifting element designed as a dog clutch, which can be actuated hydraulically on one side. The dog clutch is arranged substantially inside a bearing support of the transmission and comprises a shifting claw, which also forms an actuating piston as a combined component. Disadvantageously, the shifting claw rotates together with the sun gear relative to the fixed housing, so that friction takes place between the seal and the housing. Moreover such a system, which is arranged inside a shaft, cannot be fitted into an automatic transmission in a space-neutral manner since it comprises a through-going central shaft.

SUMMARY OF THE INVENTION

The purpose of the present invention is to provide an arrangement of a dog clutch in a transmission, which is as neutral as possible in relation to fitting space.

Accordingly, an arrangement with at least one dog clutch or the like in a transmission is proposed, which can be connected to at least one component of the transmission, the dog clutch being arranged substantially radially inside a bearing support or suchlike of the transmission. In this way a claw shifting element is realized as fitting-space-neutral as possible, in particular for an automatic transmission preferably based on planetary gearsets. However, the proposed arrangement can also be used in other transmissions as well. Thanks to the arrangement in the area of the bearing support, the best possible use can be made of the space available in the transmission housing.

Preferably, in the proposed arrangement the shifting claw of the dog clutch that is actuated hydraulically on at least one side can also form the actuating piston as a combined component, and the cylinder for the hydraulic action upon or actuation of the dog clutch is arranged fixed on the housing. Since the shifting claw and the actuating piston are formed as a combined component, the number of separate components needed can be reduced.

Moreover, in the proposed arrangement the shifting claw can be arranged radially outside and able to move axially on a shaft of the transmission, for example a driveshaft or the like.

In the context of the present invention it can be provided that for fixing a component of the transmission, the shifting claw is attached in a rotationally fixed manner on the bearing support fixed to the housing, for example that of a spur gear or the like. Thus, by means of the shifting claw any gearset element of the transmission can be fixed. Preferably, for example, a component of a planetary gearset such as a sun gear or suchlike can be connected to the housing by the shifting claw.

For example, for that purpose it can be provided that in its closed position, the shifting claw is connected to the component to be fixed, such as the sun gear, for example by crown gearing, spline gearing or the like.

In a possible further development of the invention it can be provided that the bearing support and the cylinder for actuating the dog clutch are made as separate components. It is also conceivable that the bearing support and the cylinder are made as a combined component. For example, the bearing support can have a corresponding recess which, as it were, forms the pressure space or cylinder space for the actuating piston on the shifting claw designed as the actuating piston.

In another embodiment of the invention it can be provided that the axially movable shifting claw is designed to be able to rotate. In this version the shifting claw can be used for connecting at least two components of the transmission.

In a related further development of the invention it can be provided that the shifting claw connects, for example, a spur gear with a planetary carrier of the transmission. For this purpose the shifting claw can for example be continuously connected by means of spline gearing or the like to the spur gear, whereas in its closed position the shifting claw is connected by crown gearing or suchlike to the planetary carrier of the planetary gearset of the transmission.

However, the shifting claw can also be used to block two components of the planetary gearset of the transmission. For example, as the components to be blocked a planetary carrier and a sun gear of the planetary gearset can be connected to one another. But other components too can be blocked relative to one another by the dog clutch. For this blocking, for example, the shifting claw can be connected continuously to the planetary carrier whereas in its closed position the shifting claw is connected to the sun gear of the planetary gearset by crown gearing or the like. In this way the planetary gearset can be blocked if necessary.

Regardless of the various versions of the invention it can be provided that to move the shifting claw to its closed position it can be actuated for example hydraulically, with a restoring spring to hold the shifting claw in its open position. It is also possible, however, for the shifting claw to be actuated hydraulically on both sides, without the need of a restoring spring.

Preferably, the shifting claw and its corresponding counterpart on the component to be shifted can for example be connected by co-operating crown gearing, or co-operating spline gearing or the like.

In an advantageous further development, the crown gearing or spline gearing of the shifting claw halves can be cambered and/or conical or designed with an undercut, and/or provided at the end with a chamfer or a radius and/or a centering cone.

Preferably, a ring gear can also be coupled as the planetary gearset component by means of the shifting claw. However, other components of the gearset or planetary gearset can also be shifted by means of the shifting claw.

It is also possible for the shifting claw to be connected with the drive input shaft in a rotationally fixed manner by spline gearing, and thus also to be centered. The corresponding counterpart of the shifting claw on the component to be shifted can preferably be mounted on the shaft by a slide bearing or the like.

When the hydraulic actuation takes place on both sides, in the arrangement according to the invention spring elements can for example be provided to enable the actuating piston to be pre-positioned when it is not pressurized. For example, a compression spring can be used in the piston space for the open condition of the shifting claw or for the closed condition of the shifting claw.

BRIEF DESCRIPTION OF THE DRAWINGS

Below, the present invention is explained in more detail with reference to the drawings, which show.

DETAILED DESCRIPTION OF THE PREFERRED EMBODIMENTS

Figure 1:
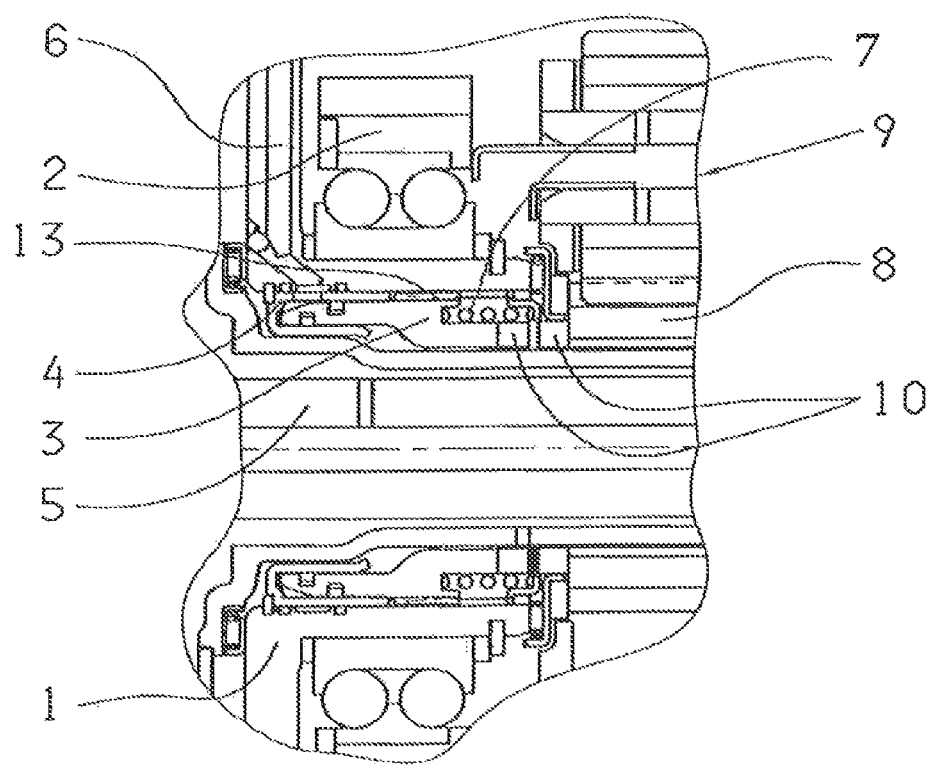
FIG. 1: A schematic, sectioned partial view of a first possible embodiment variant of an arrangement according to the invention with a dog clutch in an automatic transmission of planetary design.

The figures show examples of various embodiment variants of an arrangement according to the invention with a dog clutch in an automatic transmission of planetary design, such that the shifting claw can be connected to at least one component of the transmission. In the various figures the same components are denoted by the same indexes.

According to the invention, the dog clutch is located substantially inside a bearing support 1, for example that of a spur gear 2, in order to achieve a fitting-space-neutral arrangement of the dog clutch in the automatic transmission. The shifting claw 3 of the dog clutch actuated hydraulically from at least one side is at the same time also designed as the actuating piston, so that one less component is needed. Furthermore, regardless of the embodiment variant concerned the cylinder 4 of the dog clutch is held fixed on the housing by the bearing support 1. In addition, the shifting claw 3 is mounted radially in spline gearing 13, 21, 24 so that it can move axially.

FIG. 1 shows a first embodiment variant of the arrangement according to the invention. In this embodiment variant the shifting claw 3 is at the same time designed as the actuating piston of the dog clutch in the form of a combined component. The shifting claw 3 is connected in a rotationally fixed manner by spline gearing 13 to the bearing support 1 of the spur gear 2, and thus fixed on the housing. To move the shifting claw 3 axially the cylinder 4 is provided, which can be pressurized via a pressure medium supply duct 6 that extends through the bearing support 1. When appropriately pressurized, the shifting claw 3 is moved to the right in the plane of the drawing to its closed position, this movement taking place against the force of the restoring spring 7. Thus, when no longer pressurized the shifting claw 3 can be moved back again by the restoring spring 7 to its open position, i.e. to the left in the drawing plane.

In the first embodiment variant the shifting claw 3 serves to immobilize a sun gear 8 of the planetary gearset 9 of the automatic transmission relative to the housing. For this purpose the shifting claw 3 comprises crown gearing 10 which co-operates with the sun gear 8 of the planetary gearset 9. The shifting claw 3 is centered by means of the spline gearing 13 relative to the bearing support 1. The pressure space in the area of the shifting claw 3 can be sealed by means of rectangular rings or the like. Sealing is also possible without a sealing element if there is a correspondingly small clearance fit between the cylinder 4 and the shifting claw 3.

Figure 2:
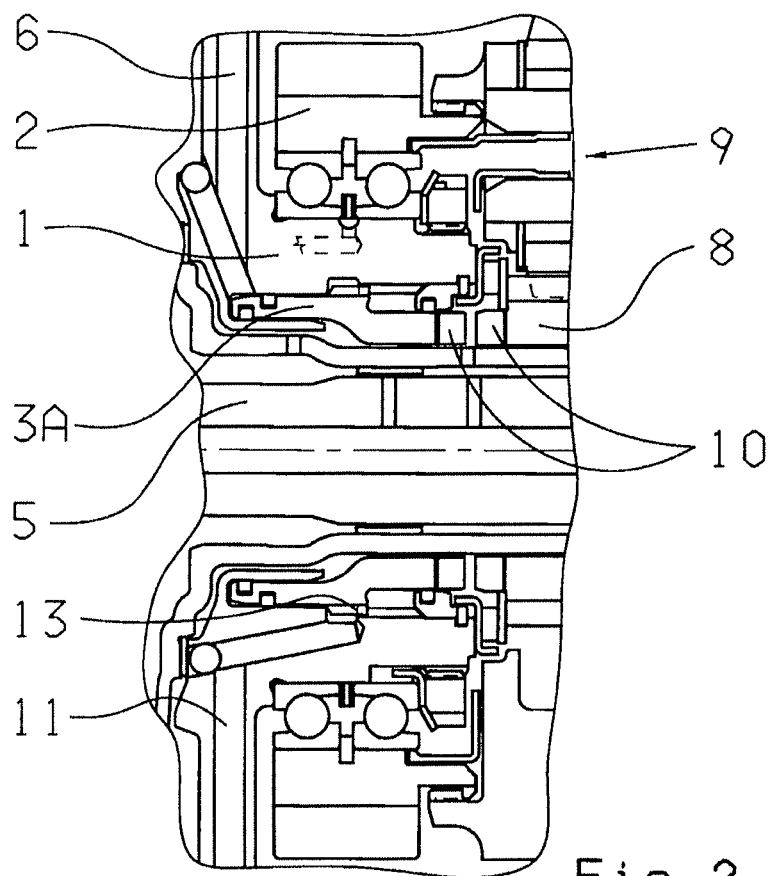
FIG. 2: A schematic, sectioned partial view of a second possible embodiment variant of the arrangement with the dog clutch.

FIG. 2 shows a second possible embodiment variant of the arrangement, in which the shifting claw 3A is actuated hydraulically on both sides so that in contrast to the first embodiment variant, no restoring spring 7 is needed. The two-sided hydraulic actuation of the shifting claw 3A has the further advantage that in the engaged condition the holding pressure can be lower and the engaged or disengaged condition can be held without, or without appreciable pressure in the system. Moreover, the reaction speed of the shifting claw 3A in the case of active disengagement or engagement can be increased considerably, because the pressures for engaging and disengaging the shifting claw 3A can be made correspondingly high.

In contrast to the first embodiment variant, in the second embodiment variant the bearing plate or bearing support 1 also forms the cylinder for hydraulic actuation of the shifting claw 3A. In this way one component can be saved. The bearing support 1 has a recess constituting the pressure space for the shifting claw 3A, which is supplied with pressure medium via the pressure medium supply duct 6. The further pressure space for returning the shifting claw 3A to its open position is supplied with pressure medium via a further pressure medium supply duct 11. The pressure medium passes through the co-operating spline gearing 13 between the bearing support 1 and the shifting claw 3A. In this case, for a better through-flow it is expedient to omit individual teeth of the spline gearing 13.

In the second embodiment variant too, the shifting claw 3A is connected fixed relative to the housing and the bearing support 1 by virtue of the spline gearing 13, and in its closed position can be connected with the sun gear 8 of the planetary gearset 9 by means of the co-operating crown gearing 10, so that the sun gear 8 is immobilized relative to the housing when the shifting claw 3A is in its engaged condition.

Figure 3:
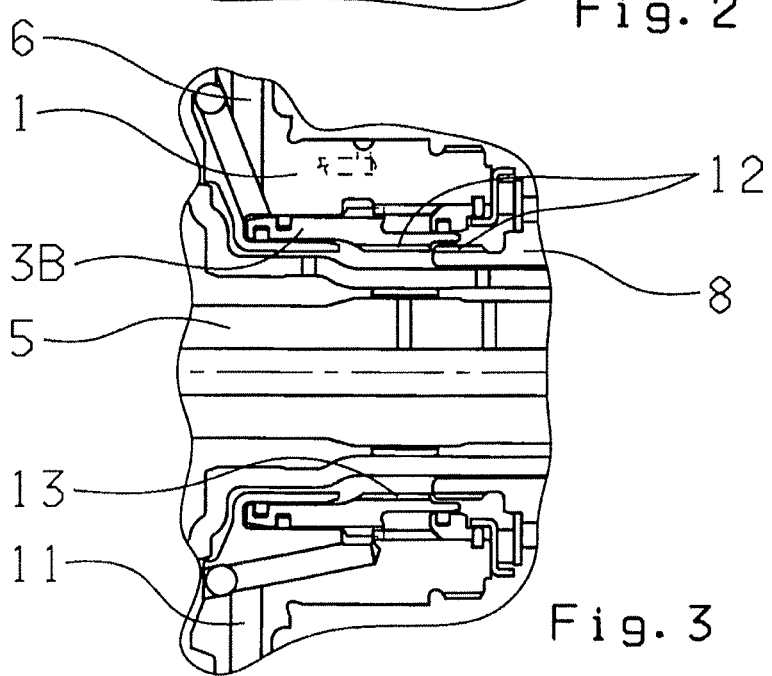
FIG. 3: A schematic, sectioned partial view of a third possible embodiment variant of the arrangement with the dog clutch.

FIG. 3 shows a third possible embodiment variant of the arrangement. In the third embodiment variant as well, the shifting claw 3B is actuated hydraulically on both sides. In contrast to the second embodiment variant, the connection between the shifting claw 3B and the sun gear 8 of the planetary gearset 9 of the automatic transmission is formed by co-operating spline gearing 12. Thus, in the third embodiment variant too, in the closed position of the shifting claw 3B, i.e. when the shifting claw 3B is on the right in the drawing plane, the sun gear 8 is immobilized relative to the housing.

Figure 4:
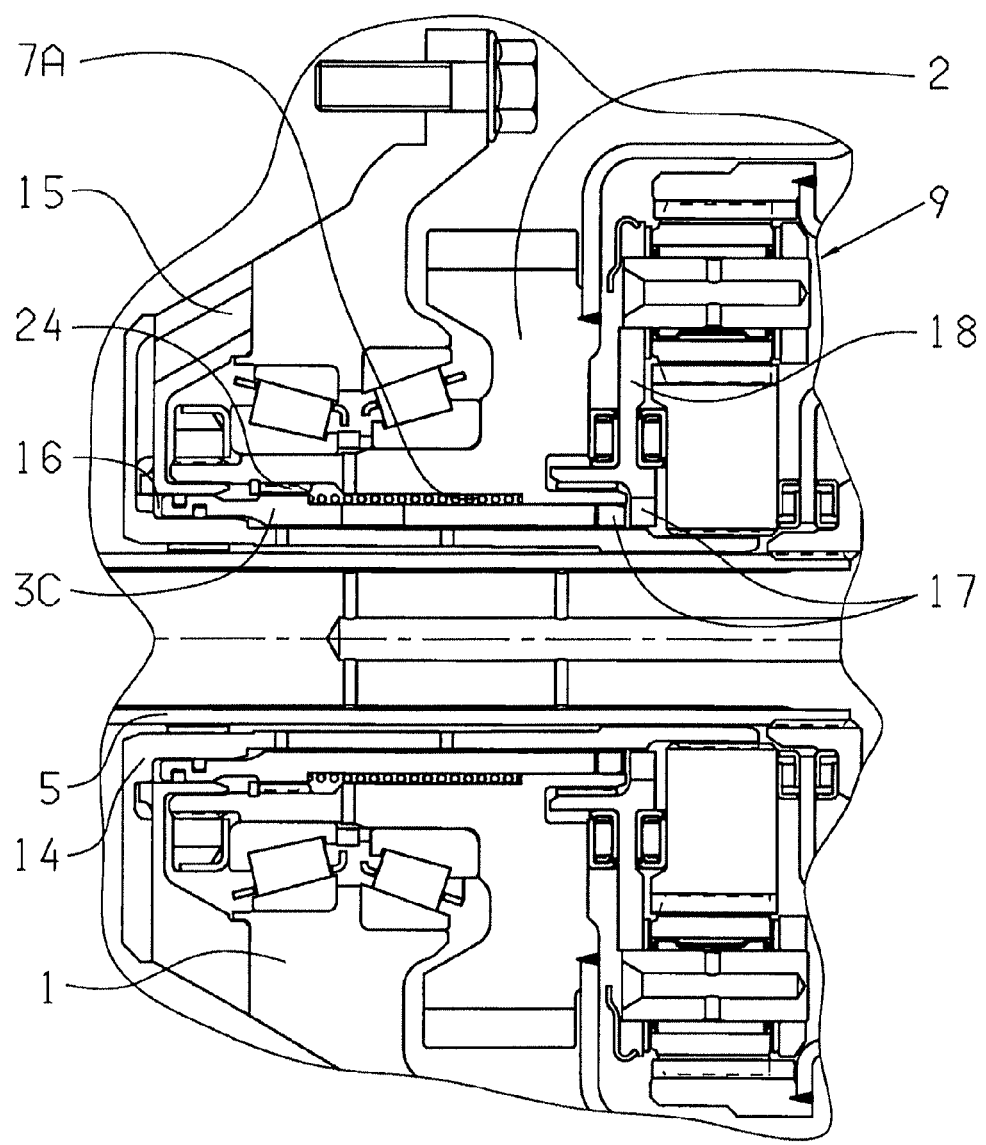
FIG. 4: A schematic, sectioned partial view of a fourth possible embodiment variant of the arrangement with the dog clutch.

FIG. 4 shows a fourth, not claimed, possible embodiment variant of the arrangement with the dog clutch in the automatic transmission of planetary design. In this embodiment variant as well the actuating piston and the shifting claw 3C are designed as a combined component. In contrast to the first three embodiment variants, in the fourth embodiment variant the shifting claw 3C is mounted so as to turn or rotate on a support (sun gear) fixed to the housing. The pressure space can be sealed toward the outside by rectangular rings or the like. However, with appropriate adjustment of the clearance between the component acting as the cylinder and the shifting claw 3C, the seal can be omitted.

In this embodiment variant the shifting claw 3C is actuated hydraulically in opposition to the force of a restoring spring 7A. Via a pressure medium or pressure oil supply duct 15 pressure oil can pass into the pressure space, to move the shifting claw 3C to its closed position against the spring force of the restoring spring 7A.

In the fourth embodiment variant the shifting claw 3C is connected in a rotationally fixed manner with the spur gear 2 by co-operating spline gearing 24, so that the shifting claw 3C rotates together with the spur gear 2. In the closed position of the shifting claw 3C it is connected by co-operating crown gearing 17 to the planetary carrier 18 of the planetary gearset 9.

Figure 5:
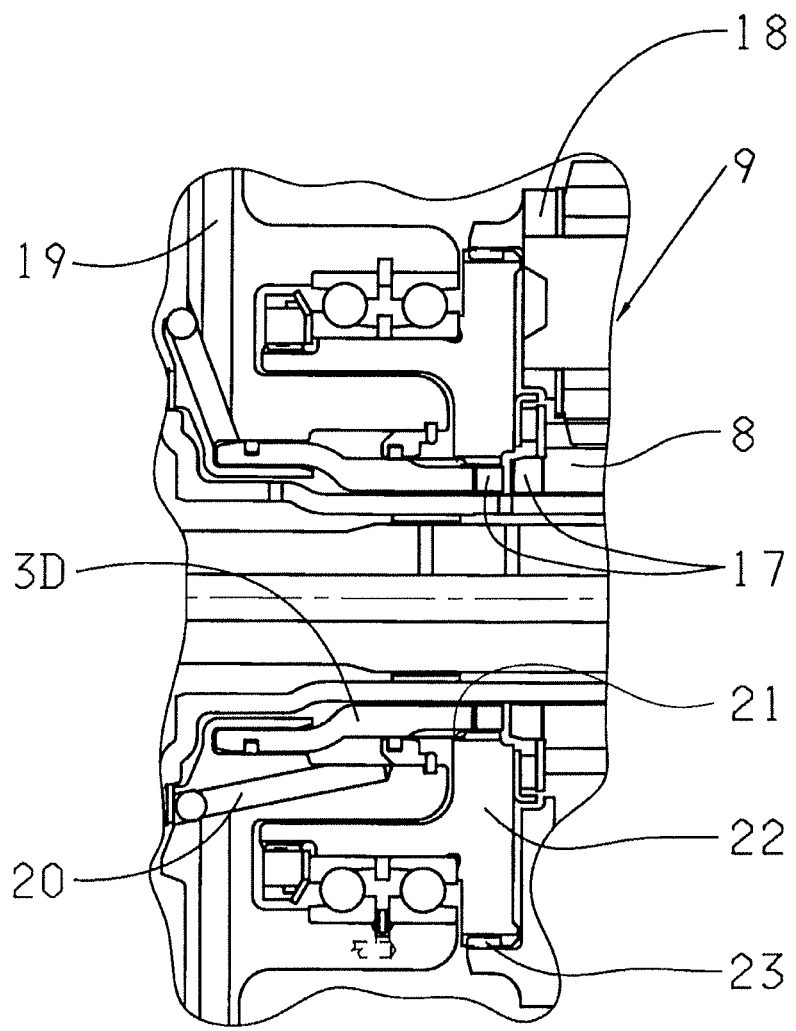
FIG. 5: A schematic, sectioned partial view of a fifth possible embodiment variant of the arrangement with the dog clutch.

FIG. 5 shows a fifth, not claimed, possible embodiment variant of the arrangement. Among other things the fifth embodiment variant differs from the fourth embodiment variant in that the shifting claw 3D is hydraulically actuated on both sides. To close the shifting claw 3D it is acted upon by pressure medium via a pressure medium supply duct 19 provided in the bearing support 1. To bring the shifting claw 3D to its open position, the shifting claw 3D is acted upon with pressure medium via a supply duct 20. The rotating shifting claw 3D can be sealed relative to the bearing support 1 by a gap seal.

In the fifth embodiment variant the shifting claw 3D is connected by spline gearing 21 to a mounting 22 of the planetary carrier 18, which is coupled with the mounting 22 by a drive-pin 23. To block the planetary gearset 9, in its closed position the shifting claw 3D can be connected to the sun gear 8 of the planetary gearset 9 by the co-operating crown gearing 17.

Regardless of the embodiment variants concerned, in FIGS. 1 to 5 the shifting claw 3, 3A, 3B, 3C and 3D is in each case shown in its open position.

INDEXES

1 Bearing support
2 Spur gear
3 Shifting claw
3A Shifting claw
3B Shifting claw
3C Shifting claw
4 Cylinder
5 Shaft
6 Supply duct
7 Restoring spring
7A Restoring spring
8 Sun gear
9 Planetary gearset
10 Crown gearing between the shifting claw and the sun gear
11 Supply duct
12 Spline gearing between the shifting claw and the sun gear
13 Spline gearing between the shifting claw and the bearing support
14 Sun gear carrier
15 Supply duct
16 Pressure space
17 Crown gearing between the shifting claw and the planetary carrier
18 Planetary carrier
19 Supply duct
20 Supply duct
21 Spline gearing between the shifting claw and the mounting of the planetary carrier
22 Mounting of the planetary carrier
23 Drive-pin
24 Spline gearing between the shifting claw and the spur gear

The invention claimed is:

1. An arrangement comprising:
at least one claw clutch in a transmission,
the arrangement being connectable with at least one component of the transmission,
the claw clutch, which is actuated hydraulically on at least one side, being arranged substantially within a bearing support (1) of the transmission, and the claw clutch comprising a shifting claw (3, 3A, 3B, 3C, 3D) which also forms an actuating piston as a combined component,
a cylinder (4) for actuating the claw clutch being fixed to a housing,
the shifting claw (3, 3A, 3B) being arranged radially on an outside of a shaft (5) on which the shifting claw is axially movable, and
the shifting claw being attached, in a rotationally fixed manner, on the bearing support (1) fixed to the housing so as to facilitating releaseable coupling to a planetary component of the transmission.

2. The arrangement according to claim 1, wherein the shifting claw (3, 3A), in an engaged position, is connected by a crown gearing (10) to a sun gear (8) of a planetary gearset (9) of an automatic transmission.

3. The arrangement according to claim 1, wherein the shifting claw (3, 3A), in an engaged position, is connected by a spline gearing (12) to a sun gear (8) of the planetary gearset (9) of an automatic transmission.

4. The arrangement according to claim 1, wherein the bearing support (1) and the cylinder (4), for actuating the claw clutch, are formed as separate components.

5. The arrangement according to claim 1, wherein the bearing support (1) and the cylinder (4), for actuating the claw clutch, are formed as a combined component.

6. The arrangement according to claim 1, wherein the shifting claw (3, 3C) is actuated hydraulically to move the shifting claw (3, 3C) to an engaged position, and a restoring spring (7, 7A) is provided for retaining the shifting claw (3, 3C) in a disengaged position.

7. The arrangement according to claim 1, wherein the shifting claw (3A, 3B, 3D) is actuated hydraulically to move the shifting claw (3, 3C) to an engaged position and actuated hydraulically to return the shifting claw (3, 3C) back into a disengaged position.

8. The arrangement according to claim 1, wherein
the shifting claw (3,3A), in an engaged position, is connected to the planetary gearset component by one of a crown gearing (10,17) and a spline gearing (12, 13, 21, 24), and
the one of the crown gearing (10, 17) and the spline gearing (12, 13, 21, 24) has at least one of camber, conically, with an undercut, at the end with either a chamfer or a radius, and with a centering cone.

9. The arrangement according to claim 1, wherein the planetary gearset component is a sun gear (8).

10. The arrangement according to claim 1, wherein the planetary gearset component is a planetary carrier (18).

11. The arrangement according to claim 1, wherein the planetary gearset component is a ring gear.

12. The arrangement according to claim 1, wherein a spur gear is mounted on the bearing support (1), radially outwardly of both the bearing support (1) and the shifting claw (3, 3A, 3B).

13. The arrangement according to claim 1, wherein the planetary gearset component is a component of an automatic transmission.

14. An arrangement comprising:
at least one claw clutch in a transmission,
the arrangement being connectable with at least one component of the transmission,
the claw clutch, which is actuated hydraulically on at least one side, being arranged substantially within a bearing support (1) of the transmission, the claw clutch comprising a shifting claw (3, 3A, 3B, 3C, 3D) which also forms an actuating piston as a combined component,
a cylinder (4) for actuating the claw clutch being fixed to a housing,
the shifting claw (3, 3A, 3B) being arranged radially on an outside of a shaft (5) on which the shifting claw is axially movable, and
the shifting claw being attached, in a rotationally fixed manner, on the bearing support (1) fixed to the housing to fix a component of the transmission;
wherein the shifting claw (3, 3A), in an engaged position, is connected by one of a crown gearing (10, 17) and a spline gearing (12, 13, 21, 24) to a sun gear (8) of a planetary gearset (9) of an automatic transmission.

15. An arrangement comprising:
at least one claw clutch in a transmission,
the arrangement being connectable with at least one component of the transmission,
the claw clutch, which is actuated hydraulically on at least one side, being arranged substantially within a bearing support (1) of the transmission, the claw clutch comprising a shifting claw (3, 3A, 3B, 3C, 3D) which also forms an actuating piston as a combined component,
a cylinder (4) for actuating the claw clutch being fixed to a housing,
the shifting claw (3, 3A, 3B) being arranged radially on an outside of a shaft (5) on which the shifting claw is axially movable, and
the shifting claw being attached, in a rotationally fixed manner, on the bearing support (1) fixed to the housing to fix a component of the transmission;
wherein one of:
(a) the bearing support (1) and the cylinder (4), for actuating the claw clutch, are formed as separate components;
(b) the shifting claw (3, 3C) is actuated hydraulically to move the shifting claw (3, 3C) to an engaged position, and a restoring spring (7, 7A) is provided for retaining the shifting claw (3, 3C) in a disengaged position; and
(c) the shifting claw (3A, 3B, 3D) is actuated hydraulically on both sides.

* * * * *